(12) United States Patent
Smith et al.

(10) Patent No.: US 11,050,305 B2
(45) Date of Patent: Jun. 29, 2021

(54) FIXED-FREQUENCY VOLTAGE CALIBRATION IN A WIRELESS POWER TRANSFER SYSTEM

(71) Applicant: Integrated Device Technology, Inc., San Jose, CA (US)

(72) Inventors: Nicholaus Smith, La Mesa, CA (US); Chan Young Jeong, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 118 days.

(21) Appl. No.: 16/378,273

(22) Filed: Apr. 8, 2019

(65) Prior Publication Data
US 2020/0204011 A1 Jun. 25, 2020

Related U.S. Application Data

(60) Provisional application No. 62/784,289, filed on Dec. 21, 2018.

(51) Int. Cl.
*H02J 50/10* (2016.01)
*H02J 50/90* (2016.01)
*H04B 17/21* (2015.01)
*H02J 7/02* (2016.01)
*H04B 5/00* (2006.01)
*H02J 50/80* (2016.01)

(52) U.S. Cl.
CPC .............. *H02J 50/90* (2016.02); *H02J 7/025* (2013.01); *H02J 50/10* (2016.02); *H02J 50/80* (2016.02); *H04B 5/0037* (2013.01); *H04B 17/21* (2015.01)

(58) Field of Classification Search
CPC .. H02J 50/90; H02J 50/80; H02J 50/10; H02J 7/025; H04B 17/21; H04B 5/0037
See application file for complete search history.

(56) References Cited

U.S. PATENT DOCUMENTS

| | | | |
|---|---|---|---|
| 7,817,447 B2* | 10/2010 | Huynh | H02M 3/33507 363/21.12 |
| 10,224,812 B1* | 3/2019 | Sen | H02M 3/158 |
| 10,601,330 B1* | 3/2020 | Cappabianca | H02M 3/33576 |
| 10,608,537 B2* | 3/2020 | You | G01R 31/40 |
| 2005/0151518 A1* | 7/2005 | Schneiker | H02M 3/156 323/222 |
| 2017/0371021 A1* | 12/2017 | Fang | G01R 31/40 |

* cited by examiner

*Primary Examiner* — Dinh T Le
(74) *Attorney, Agent, or Firm* — Haynes and Boone, LLP (57) ABSTRACT

Embodiments herein provide a device for calibrating a voltage driven by a PWM signal for a circuit board. The device includes a controller configured to generate the PWM signal according to a PWM duty cycle value, and a voltage regulator configured to generate an output voltage according to the PWM signal. The controller is further configured to calibrate a relationship between the PWM duty cycle value and the output voltage based on a plurality of configured PWM duty cycle values and a plurality of corresponding voltages measured from the voltage regulator, and drive the circuit board by configuring the PWM duty cycle value based on the calibrated relationship.

20 Claims, 5 Drawing Sheets

FIXED-FREQUENCY VOLTAGE CALIBRATION IN A WIRELESS POWER TRANSFER SYSTEM

CROSS-REFERENCE

This application claims the benefit, under 35 U.S.C. § 119(e), of co-pending and commonly-owned U.S. provisional application No. 62/784,289, filed on Dec. 21, 2018, which is hereby expressly incorporated herein by reference.

TECHNICAL FIELD

Embodiments of the present invention are related to wireless transmission of power and, in particular, to fixed-frequency voltage calibration in a wireless power transmitter.

DISCUSSION OF RELATED ART

Mobile devices, for example smart phones, tablets, wearables and other devices are increasingly using wireless power charging systems. Wireless power transfer involves a transmitter driving a transmitter coil and a receiver with a receiver coil placed proximate to the transmitter coil. The receiver coil receives the wireless power generated by the transmit coil and uses that received power to drive a load, for example to provide power to a battery charger. The transmission coil is usually driven by a switching circuit, which receives a regulated voltage from an input power source. Noise, clock differences, or errors on a circuit board can usually impair the reliability and accuracy of the regulated voltage that is fed to the switching circuit, i.e. the regulated voltage may deviate from a target voltage level that is configured. The inaccuracy of the regulated voltage often has a significant impact on the performance of the wireless power transfer system.

Therefore, there is a need to improve the reliability of regulated voltages in the wireless power transfer system.

SUMMARY

In view of the voltage reliability issue in the wireless power transfer system, embodiments described herein provide a method for calibrating a voltage driven by a pulse-width modulation (PWM) signal for a circuit board. Specifically, the method includes generating a PWM signal according to a PWM duty cycle value, and then generating, via a voltage regulator, an output voltage according to the PWM signal. The method further includes calibrating a relationship between the PWM duty cycle value and the output voltage based on a plurality of configured PWM duty cycle values and a plurality of corresponding voltages measured from the voltage regulator. The method further includes driving the circuit board by configuring the PWM duty cycle value based on the calibrated relationship.

Embodiments herein further provide a device for calibrating a voltage driven by a PWM signal for a circuit board. The device includes a controller configured to generate the PWM signal according to a PWM duty cycle value, and a voltage regulator configured to generate an output voltage according to the PWM signal. The controller is further configured to calibrate a relationship between the PWM duty cycle value and the output voltage based on a plurality of configured PWM duty cycle values and a plurality of corresponding voltages measured from the voltage regula- tor, and drive the circuit board by configuring the PWM duty cycle value based on the calibrated relationship.

These and other embodiments are discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Figure 1:
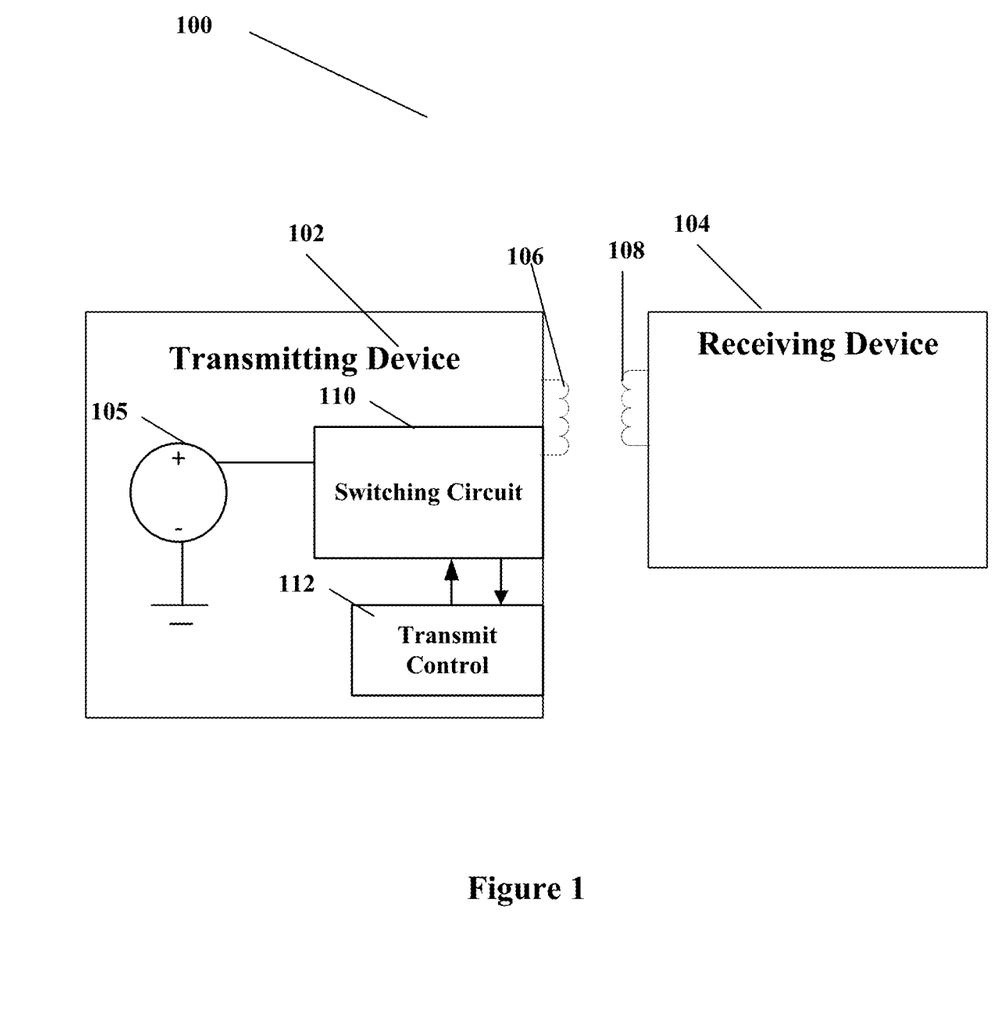
FIG. 1 illustrates a wireless power system 100 according to some embodiments of the present invention.

FIG. 1 illustrates a wireless power system 100 according to some embodiments of the present invention. As illustrated in FIG. 1, a transmitting device 102 transfers wireless power to a receive device 104. Transmitting device 102 is powered by a direct current (DC) input 105 (e.g., from 5V to 19V, etc.), which can be derived from a Universal Serial Bus (USB) bus or an AC/DC power adapter. The transmitting device 102 includes a switching circuit 110 coupled to the DC input source 105 and the transmitter coil 106. The transistor array 110 produces an alternate current that is fed to the transmitter coil 106, which in turn generates a time-varying electromagnetic field. In this way, the transmitter coil 106 transfers power to the receiver coil 108 coupled to the receiving device 104 via electromagnetic induction.

The receiver coil 108 is coupled to a rectifier circuit within the receiving device 104, which receives and rectifies wireless power received at the receiver coil 108, and then in turn provides an output voltage for battery charging.

Figure 2:
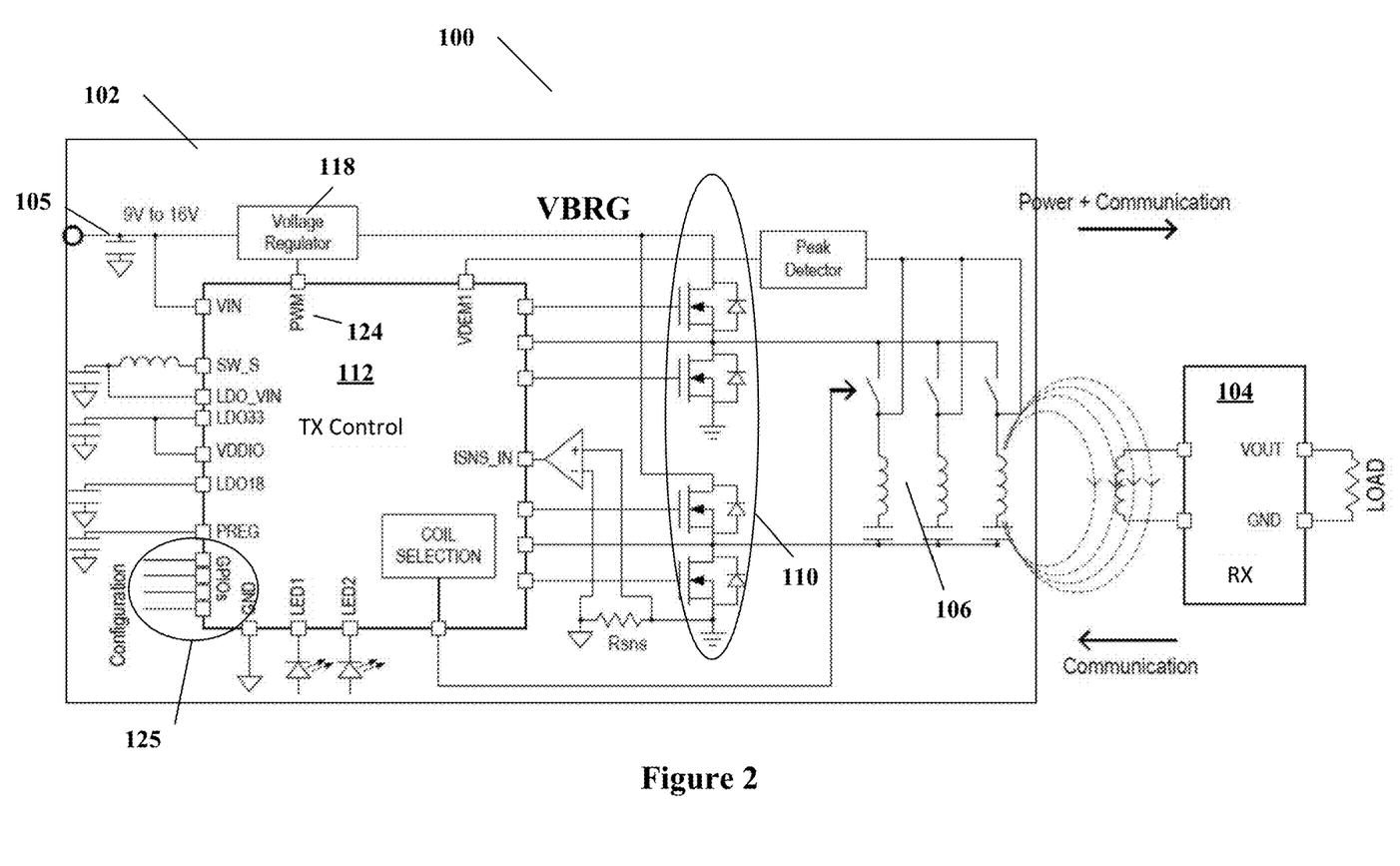
FIG. 2 illustrates a detailed structure of the transmitting device for voltage calibration in the wireless power transfer system, according to embodiments described herein.

FIG. 2 illustrates a detailed structure of the transmitting device 102 for voltage calibration in the wireless power transfer system 100, according to embodiments described herein. The transmitting device 102 includes a voltage regulator 108, which receives the input voltage (e.g., 9V to 16V) from the power source 105 and provides a voltage $V_{BRG}$ to the switching circuit 110. Voltage regulator 108 is driven by a PWM signal 124 output from the transmit control module 112.

The transmit control module 112 can be a dedicated transmit integrated circuit as shown in FIG. 2. The transmit control module 112 includes a processor, which may execute processor-readable instructions stored from a storage medium such as a memory, to control transmitter functions, e.g., to control a PWM signal that drives the switching circuit 110. For example, the transmit control module 111 may configure the duty cycle (%) of a PWM signal that is used to drive a voltage regulator 118, which in turn provides a regulated voltage to the drain of each half-bridge in the switching circuit 110. By generating and controlling the PWM signal, the transmit control module 112 in turn controls the alternate current (AC) current that passes through the transmitter coil 106. An example of the transmit control module 112 may be the Integrated Device Technology® P9261 chip.

The transmit control module 112 is configured to generate a second PWM signal 124 based PWM duty cycle values (%) to drive the voltage regulator 118 with feedback node or other method or output voltage control. The configuration settings of the PWM cycle values may be programmed into the registers within the transmit control module 112, via input pins 125. For example, a user or a developer may program the PWM cycle values, or a processor of a device that employs and controls the wireless power transfer system 100 may program the PWM cycle values.

Due to various error or noise factors associated with a specific circuit board on which the transmit control module 112 resides on, the PWM signal 124 that is generated according to a specific PWM duty cycle setting may not result in a desired regulated voltage $V_{BR}G$ reliably from the voltage regulator 118. The error or noise factors include, but not limited to external component variation tolerances, internal clock differences, low drop-out regulator voltage level, analog-to-digital converter (ADC) errors, samples rates, and output noise, etc. These factors may cause variations from circuit board to circuit board, and result in inaccuracies in the regulated voltage $V_{BRG}$ even when the PWM duty cycle settings have been programmed accordingly to achieve a target $V_{BR}G$. In addition, if any part of the transmit control module 112 is changed or customized, the change may lead to a completely wrong conversion from the register settings of PWM duty cycle values to the output $V_{BRG}$ voltage from the voltage regulator 118. Conventional systems only run measurement routines of $V_{BRG}$ when a new $V_{BRG}$ voltage is set, and errors due to board-to-board variations are usually ignored, resulting in inaccurate and unreliable $V_{BRG}$ voltage applied to the switching circuit 110 or it takes much longer to get the $V_{BRG}$ to the correct value in a series of change, measure, change approximations toward converging on the desired setpoint.

Therefore, the transmit control module 111 is configured to calibrate the relationship between the PWM signal and the regulated voltage that is output from the voltage regulator, based on which a PWM duty cycle value (%) can be programmed to achieve a desired regulated voltage for the switching circuit 110. The calibration routine may be implemented by firmware (FW) and/or software of the transmit control module 112. Specifically, the transmit control module 112 is configured to execute processor-readable instructions to calculate and configure, PWM duty cycle values to be used, when new configuration settings (such as Digital ping voltage, Qmeas voltage, VBRG_Max_settings, thermal throttling, etc.) are programmed into the registers in the transmit control module 112. The voltage regulator 118 may in turn react accordingly to the new configuration settings by performing a sweep of the newly configured PWM duty cycle values (e.g., 0%, 10%, 20%, . . . 80%, 90%, etc.) and monitoring the output $V_{BRG}$. The relationship between the PWM signal 124 and $V_{BRG}$ can thus be characterized board-by-board (e.g., for each printed circuit board (PCB)), and the characterized PWM-$V_{BRG}$ relationship may in turn be used to calculate and set PWM duty cycle values for the PWM signal 124 to achieve a particular $V_{BRG}$. In this way, the calibration routine may refine $V_{BRG}$ level on a unit-by-unit basis and allow for aging correction.

Figure 3:
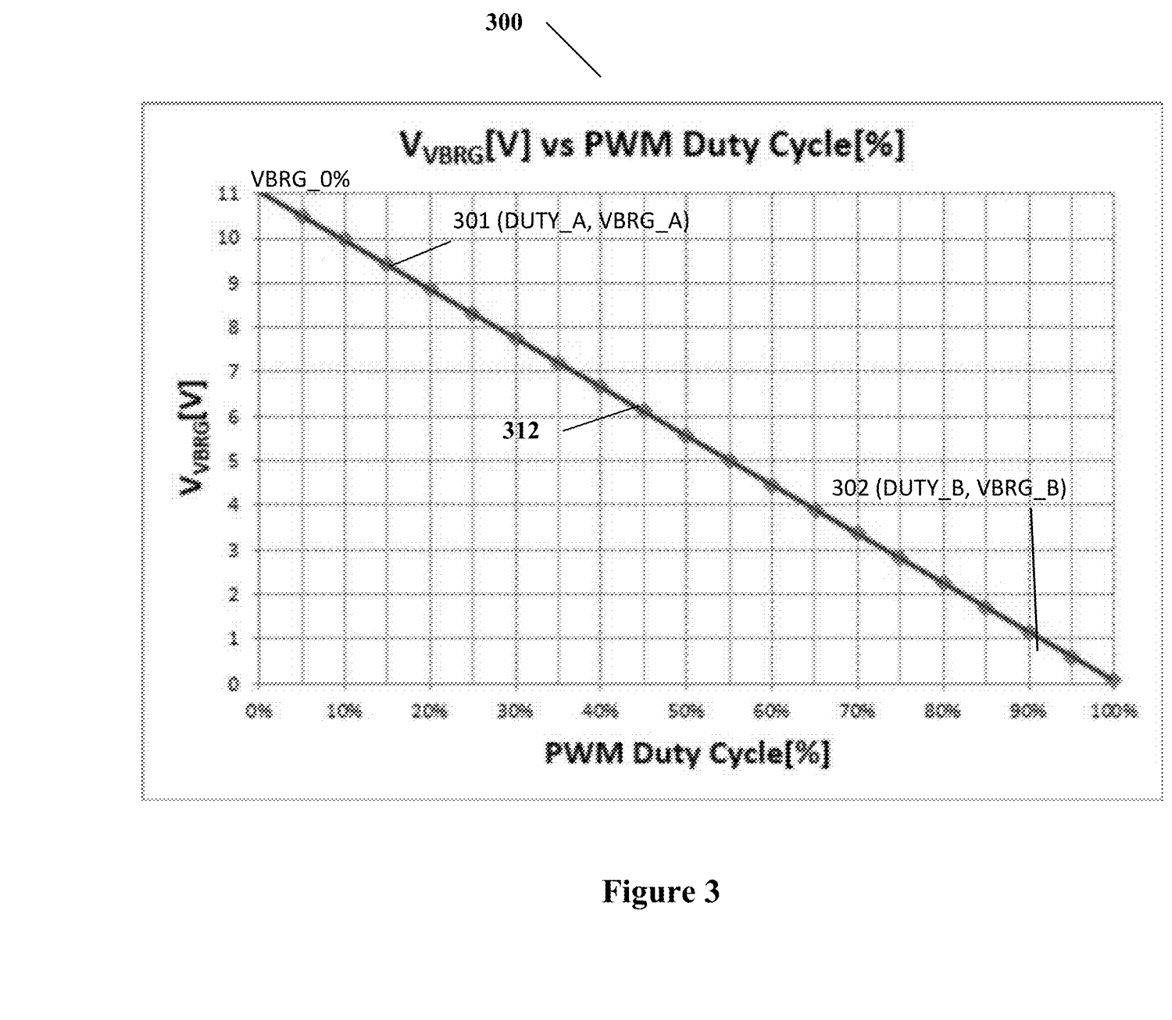
FIG. 3 illustrates a data plot diagram showing an example relationship between $V_{BRG}$ and the PWM duty cycle, according to embodiments described herein.

FIG. 3 illustrates a data plot diagram showing an example relationship between $V_{BRG}$ and the PWM duty cycle, according to embodiments described herein. A linear relationship between $V_{BRG}$ and the PWM duty cycle may be established, as shown at line 312, based on previously measured $V_{BRG}$ and corresponding PWM duty cycle data points such as data points 301 and 302. Board variation manifests as differences in the slope and the intercept of line 312. In some embodiments, a non-linear relationship between $V_{BRG}$ and the PWM duty cycle may be established by applying different regression models based on the previously measured $V_{BRG}$ and corresponding PWM duty cycle data points.

Figure 4:
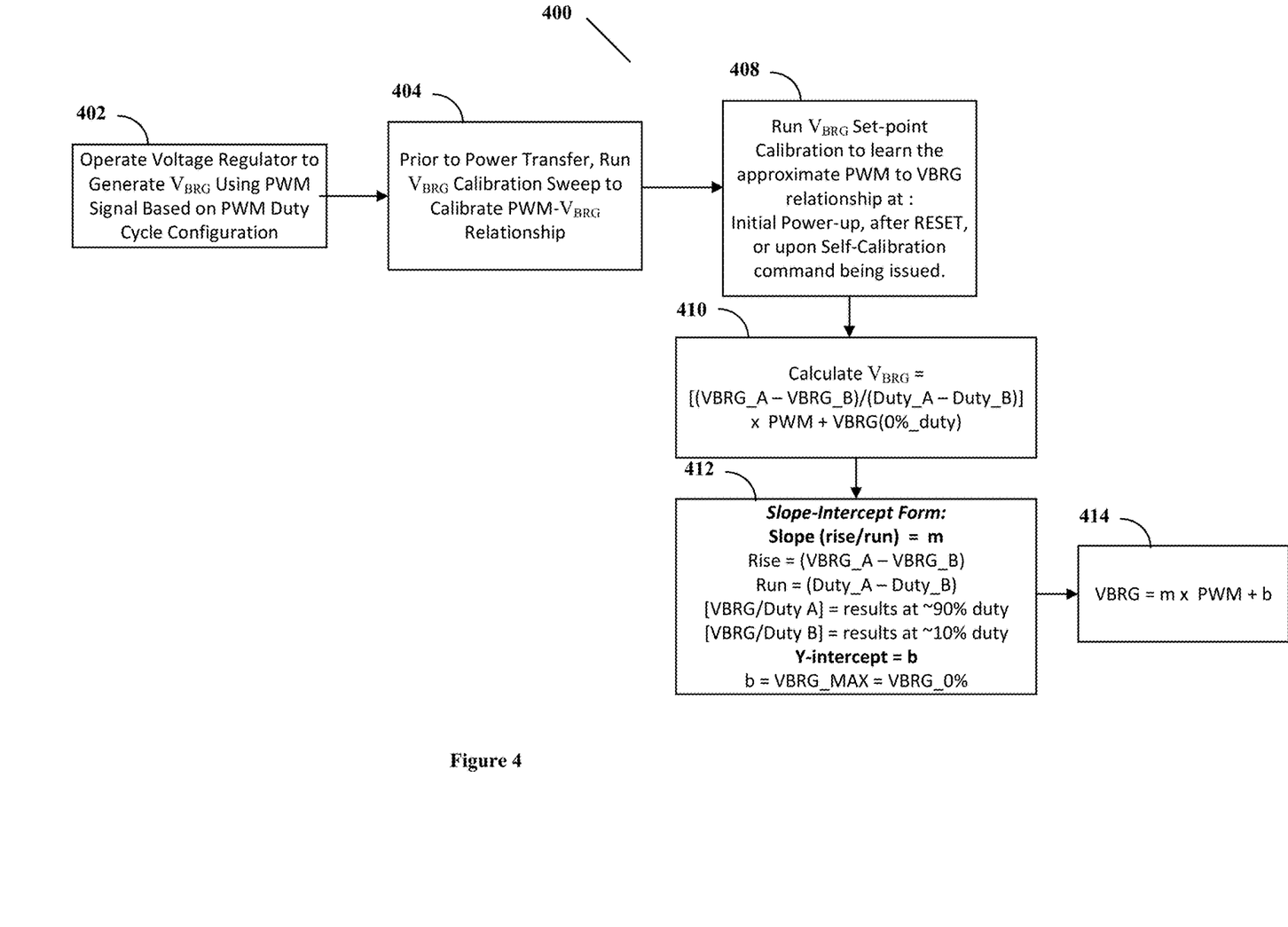
FIG. 4 illustrates an example logic flow diagram showing a process of voltage calibration, according to an embodiment described herein.

FIG. 4 illustrates an example logic flow diagram showing a process 400 of $V_{BRG}$ calibration, according to an embodiment described herein. At step 402, the voltage regulator 118 is operated to generate the voltage $V_{BRG}$ using PWM signal 124 which is generated by the transmit control module 112 based on PWM duty cycle configuration. As discussed above, due to component variation at different PCBs, the PWM duty cycle value that is configured to achieve a particular $V_{BRG}$ voltage may vary board-to-board. To calibrate the actual PWM duty cycle value used for a particular $V_{BRG}$ voltage at a particular PCB, at step 404, a $V_{BRG}$ calibration sweep is run to calibrate the PWM-$V_{BRG}$ relationship prior to wireless power transfer at the wireless power transfer system 100. For example, a number of example PWM duty cycle values may be programmed to the registers in the transmit control module 112 via the GPIO pins 125 shown in FIG. 2, and the resulting $V_{BRG}$ voltage from the voltage regulator 118 is monitored. The ($V_{BRG}$, PWM duty cycle %) pair may then be plotted to calibrate the PWM-$V_{BRG}$ relationship, e.g., the linear relationship as shown by line 312 in FIG. 3, all within reasonable limits for accuracy to force convergence to an expected value.

Specifically, at step 408, the PWM-$V_{BRG}$ relationship calibration is initiated to obtain set-point measurements at initial power-up of the wireless power transfer system 100, after a RESET of system 100, and/or upon receipt of a self-calibration command.

At step 410, upon obtaining the set-point measurements, the PWM-$V_{BRG}$ linear relationship may be established based on at least two measured pairs (DUTY_A, VBRG_A) and (DUTY_B, VBRG_B) as shown at data points 301 and 302, e.g., $$V_{BRG} = [(VBRG\_A - VBRG\_B)/(Duty\_A - Duty\_B)] \times PWM + VBRG(0\%\_duty)$$

Thus, at step 412, in a Slope-Intercept Form, at step 412, the slope m of the linear relationship is calculated as Rise/Run, at which the Rise=(VBRG_A−VBRG_B), the Run=(Duty_A−Duty_B). For example, although any two data points can be used for establishing the linear relationship, data point (DUTY_A, VBRG_A) may be measured at 10% duty cycle, and data point (DUTY_B, VBRG_B) may be measured at 90% duty cycle. The y-intercepts b is obtained as the measured $V_{BRG}$ at PWM of 0% duty cycle.

At step 414, the linear PWM-$V_{BRG}$ relationship can be obtained as:

$$V_{BRG}=M\times PWM+b,$$

using the calculated slope and y-intercept of the linear line 312.

Figure 5:
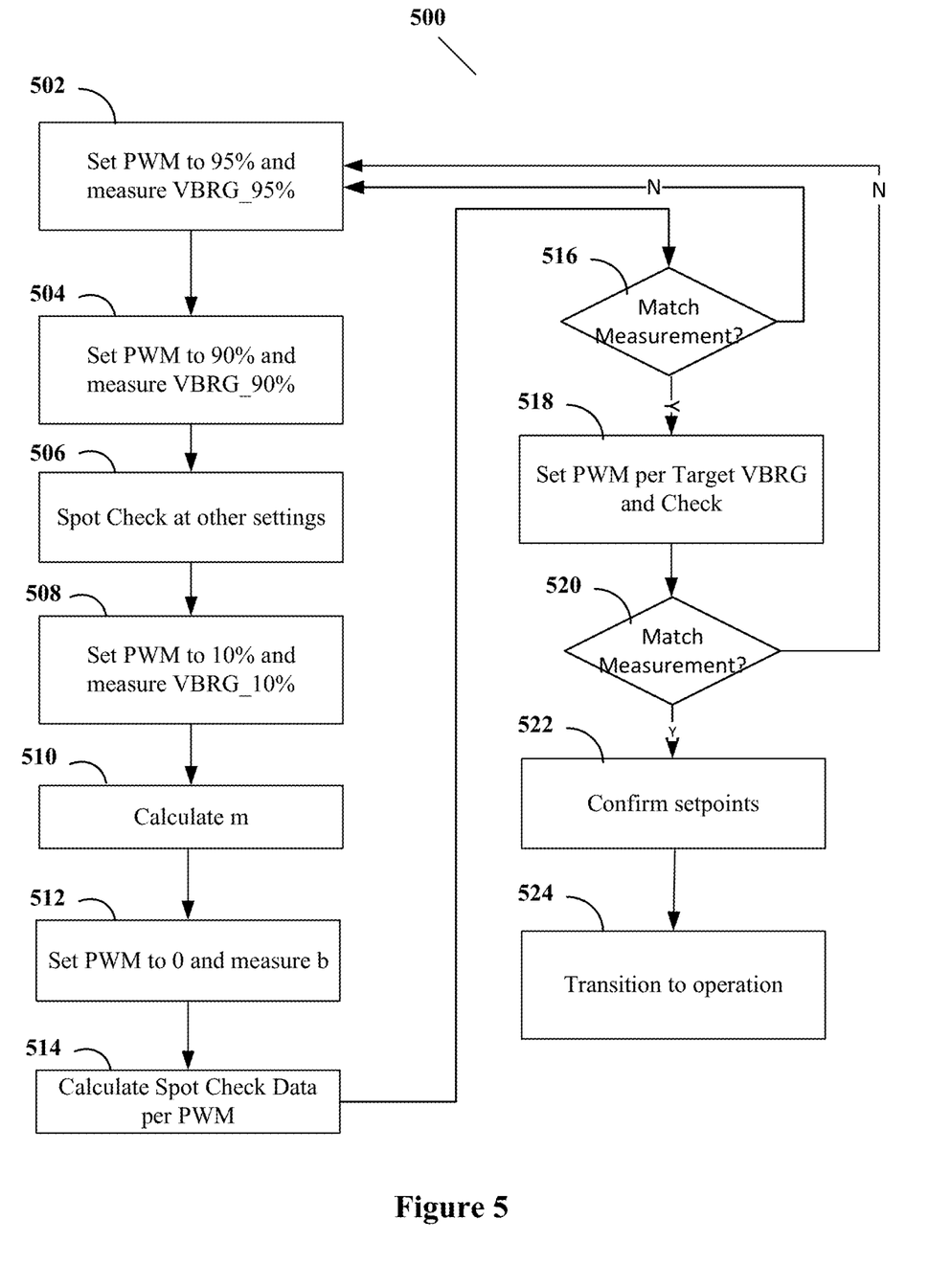
FIG. 5 is an example logic flow diagram showing process of PWM-$V_{BRG}$ relationship computation and re-calibration, according to an embodiment described herein.

FIG. 5 is an example logic flow diagram showing process 500 of PWM-$V_{BRG}$ relationship computation and re-calibration, according to an embodiment described herein. The example duty cycle values shown in FIG. 5 and throughout the application are for illustrative purpose only. Different duty cycle values may be used in process 500.

At step 502, a PWM duty cycle setting of 95% is programmed to the transmit control module 112, and the resulting $V_{BRG}$_95% is measured at the output of voltage regulator 118. At step 504, a PWM duty cycle setting of 90% is programmed to the transmit control module 112, and the resulting $V_{BRG}$_90% is measured at the output of voltage regulator 118, e.g., using as data point (Duty_B, VBRG_B) 302. At step 506, further data points are obtained to perform a spot check. For example, PWM duty cycle settings of 75%, 50%, 25% are programmed into the transmit control module 112, and VBRG_75%, VBRG_50%, and VBRG_25% are measured, respectively. At step 508, a PWM duty cycle setting of 10% is programmed to the transmit control module 112, and the resulting VBRG_10% is measured. For example, the measurement at duty cycle of 10% can be used as data point 301 (Duty_A, VBRG_A). At step 510, the slope m of the linear relationship is calculated using the measurements (Duty_A, VBRG_A) and (Duty_B, VBRG_B), e.g., the measurements obtained at PWM 10% and 90%. At step 512, a PWM duty cycle setting of 0% is programmed to the transmit control module 112, and the resulting VBRG_0% is measured, which represents the y-intercept parameter b of the linear relationship.

The accuracy of the PWM-$V_{BRG}$ linear relationship may then be verified, e.g., board by board, by comparing the calculated $V_{BRG}$ with the measured $V_{BRG}$ for a particular PWM duty cycle value. The verification may be implemented in two ways: (1) by setting a fixed PWM duty cycle value, and measuring the resulting $V_{BRG}$ versus the calculated $V_{BRG}$; and/or (2) by computing and configuring a PWM duty cycle value based on a target $V_{BRG}$, and measuring the resulting $V_{BRG}$ versus the target $V_{BRG}$. The verification methods (1) and (2) may be implemented consecutively in any order, concurrently, jointly or separately.

For example, at step 514, spot check data is calculated based on the linear relationship, e.g., VBRG_75%, VBRG_90%, and VBRG_95% is calculated using the linear equation $V_{BRG}$=m×PWM+b by setting PWM=0.75, 0.9, 0.95, respectively. The actual $V_{BRG}$ is then measured by programming PWM duty cycle at 75%, 90%, 95%, respectively. At step 516, the measured $V_{BRG}$ is then compared to the calculated $V_{BRG}$ to determine whether a match is verified, e.g., the difference between the measured $V_{BRG}$ and the calculated $V_{BRG}$, if any, is within an acceptable range, for example to within ~5%. When a match is verified at step 516, process 500 continues to step 520 for another round of spot check. When the measured $V_{BRG}$ does not match with the calculated $V_{BRG}$, process 500 proceeds to step 502 to repeat steps 502-514 and recalibrate the PWM-$V_{BRG}$ relationship.

At step 518, the PWM-$V_{BRG}$ relationship is further verified by: calculating a respective PWM duty cycle value to achieve a given $V_{BRG}$ value (e.g. $V_{BRG}$=0.3V), based on the linear relationship. The calculated PWM duty cycle value is then programmed to the transmit control module 112 to generate the corresponding PWM signal 124, under which the resulting $V_{BRG}$ from voltage regulator 118 is measured. At step 520, the measured $V_{BRG}$ is compared against the target $V_{BRG}$ value to determine whether a match is verified, e.g., the difference between the measured $V_{BRG}$ and the target $V_{BRG}$ is within an acceptable range, for example to within ~5%. If no match is verified, process 500 goes back to step 502 to repeat steps 502-514 and recalibrate the PWM-$V_{BRG}$ relationship. If a match is verified, process 500 goes to step 522. The match verification at step 520 may be performed with multiple setpoints of (PWM, $V_{BRG}$). For example, PWM duty cycle settings can be programmed to achieve a target $V_{BRG}$ of 0.3V, 4V, etc., respectively, and the resulting $V_{BRG}$ are measured and compared with the targets of 0.3V, 4V, respectively. At step 522, the setpoints (PWM, $V_{BRG}$) within the acceptable error limit can be obtained.

In some examples, the match requirements may be revised. For example, after multiple rounds of recalibration, if none or few matches can be verified, the acceptable error limit may be relaxed. For another example, the acceptable error limit may be tightened when the resulting $V_{BRG}$ appears to be inaccurate and thus negatively impacts system performance. For another example, different PCBs may yield different acceptable error limits, which may be adjusted based on $V_{BRG}$ accuracy.

At step 524, process 500 transitions to the operation of wireless power transfer system 100 using the calibrated PWM-$V_{BRG}$ relationship to select and program PWM duty cycle parameters in order to achieve a given $V_{BRG}$ level.

The above detailed description is provided to illustrate specific embodiments of the present invention and is not intended to be limiting. Numerous variations and modifications within the scope of the present invention are possible. The present invention is set forth in the following claims.

What is claimed is:

1. A method of providing a voltage from a voltage regulator driven by a pulse-width modulation (PWM) signal, the method comprising:
generating, in a controller, the PWM signal according to a PWM duty cycle value that is configured to achieve a particular output voltage from the voltage regulator according to a relationship between the PWM duty cycle and the output voltage;
generating, in the voltage regulator, the particular output voltage according to the PWM signal;
calibrating, in the controller, the relationship between the PWM duty cycle value and the output voltage based on measurement by the controller of a plurality of configured PWM duty cycle values and a plurality of corresponding output voltages from the voltage regulator; and
driving the voltage from the voltage regulator by configuring the PWM duty cycle to achieve the voltage based on the calibrated relationship,
wherein the regulator and the controller are mounted on a circuit board.

2. The method of claim 1, wherein generating the PWM signal includes determining the PWM duty cycle value from the relationship programmed, via input pins, into one or more registers of a controller.

3. The method of claim 1, wherein calibrating the relationship between the PWM duty cycle value and the voltage includes performing the calibration at an initial power-up of the circuit board, after a reset of the circuit board, or upon a calibration command.

4. The method of claim 1, wherein the calibrating the relationship between the PWM duty cycle value and the output voltage based on the plurality of configured PWM duty cycle values and the plurality of corresponding voltages measured from the voltage regulator comprises:
configuring a first PWM duty cycle value for a first PWM signal;
measuring a first output voltage from the voltage regulator driven by the first PWM signal;
configuring a second PWM duty cycle value for a second PWM signal;
measuring a second output voltage from the voltage regulator driven by the second PWM signal; and
computing a slope for a linear relationship based on the first and the second PWM duty cycle values, and the first and the second output voltages.

5. The method of claim 4, wherein the computing the slope for a linear relationship based on the first and the second PWM duty cycle values, and the first and the second output voltages comprises:
dividing a difference between the first output voltage and the second output voltage by a difference between the first PWM duty cycle value and the second PWM duty cycle value.

6. The method of claim 4, further comprising:
configuring a third PWM duty cycle value as 0% for a third PWM signal;
measuring the third output voltage from the voltage regulator driven by the third PWM signal; and
determining a y-intercept of the linear relationship as the third output voltage.

7. The method of claim 1, wherein the calibrating the relationship between the PWM duty cycle value and the output voltage based on the plurality of configured PWM duty cycle values and the plurality of corresponding voltages measured from the voltage regulator comprises:
configuring a first PWM duty cycle value for a first PWM signal;
computing a first output voltage based on the first PWM duty cycle value and the relationship;
measuring an actual output voltage from the voltage regulator driven by the first PWM signal;
comparing the first calculated output voltage with the measured actual output voltage; and
re-calibrating the relationship between the PWM duty cycle value and the output voltage when a difference between the first calculated output voltage and the measured actual output voltage exceeds an acceptable error range.

8. The method of claim 1, wherein the calibrating the relationship between the PWM duty cycle value and the output voltage based on the plurality of configured PWM duty cycle values and the plurality of corresponding voltages measured from the voltage regulator comprises:
computing a first PWM duty cycle value corresponding to a target output voltage based on the relationship;
configuring the first PWM duty cycle value for a first PWM signal;
measuring an actual output voltage from the voltage regulator driven by the first PWM signal;
comparing the target output voltage with the measured actual output voltage; and
re-calibrating the relationship between the PWM duty cycle value and the output voltage when a difference between the target output voltage with the measured actual output voltage e exceeds an acceptable error range.

9. The method of claim 8, further comprising:
adjusting the acceptable error range based on output voltage performance.

10. The method of claim 1, wherein the driving the circuit board by configuring the PWM duty cycle value based on the calibrated relationship comprises:
computing a set PWM duty cycle value based on the calibrated relationship and a target output voltage;
configuring the set PWM duty cycle value for a set PWM signal; and
generating the target output voltage according to the set PWM signal.

11. A device for providing a voltage driven by a pulse-width modulation (PWM) signal, the device comprising:
a controller configured to generate the PWM signal according to a PWM duty cycle value according to a relationship between the PWM duty cycle and voltage;
a voltage regulator coupled to the control, the voltage regulator being configured to generate an output voltage from the PWM signal; and
wherein the controller is further configured to:
calibrate the relationship between the PWM duty cycle value and the output voltage based on measurement of a plurality of configured PWM duty cycle values and a plurality of corresponding voltages at the voltage regulator, and
drive the voltage regulator by configuring the PWM duty cycle value based on the calibrated relationship to achieve the voltage, and
wherein the controller and the voltage regulator are mounted on a circuit board.

12. The device of claim 11,
wherein the controller includes one or more input pins configured to receive programmed PWM duty cycle values associated with voltages into one or more registers of the controller.

13. The device of claim 11, wherein the controller is further configured to calibrate the relationship between the PWM duty cycle value and the output voltage at an initial power-up of the circuit board, after a reset of the circuit board, or upon a calibration command.

14. The device of claim 11, wherein the controller is further configured to calibrate the relationship between the PWM duty cycle value and the output voltage based on the plurality of configured PWM duty cycle values and the plurality of corresponding voltages measured from the voltage regulator by:
configuring a first PWM duty cycle value for a first PWM signal;
measuring a first output voltage from the voltage regulator driven by the first PWM signal;
configuring a second PWM duty cycle value for a second PWM signal;
measuring a second output voltage from the voltage regulator driven by the second PWM signal; and
computing a slope for a linear relationship based on the first and the second PWM duty cycle values, and the first and the second output voltages.

15. The device of claim 14, wherein the controller is further configured to compute the slope for a linear relationship based on the first and the second PWM duty cycle values, and the first and the second output voltages by:
dividing a difference between the first output voltage and the second output voltage by a difference between the first PWM duty cycle value and the second PWM duty cycle value.

16. The device of claim 14, wherein the controller is further configured to:
configure a third PWM duty cycle value as 0% for a third PWM signal;
measure the third output voltage from the voltage regulator driven by the third PWM signal; and
determine a y-intercept of the linear relationship as the third output voltage.

17. The device of claim 11, wherein the controller is further configured to calibrate the relationship between the PWM duty cycle value and the output voltage based on the plurality of configured PWM duty cycle values and the plurality of corresponding voltages measured from the voltage regulator by:
configuring a first PWM duty cycle value for a first PWM signal;
computing a first output voltage based on the first PWM duty cycle value and the relationship;
measuring an actual output voltage from the voltage regulator driven by the first PWM signal;
comparing the first calculated output voltage with the measured actual output voltage; and
re-calibrating the relationship between the PWM duty cycle value and the output voltage when a difference between the first calculated output voltage and the measured actual output voltage exceeds an acceptable error range.

18. The device of claim 11, wherein the controller is further configured to calibrate the relationship between the PWM duty cycle value and the output voltage based on the plurality of configured PWM duty cycle values and the plurality of corresponding voltages measured from the voltage regulator by:
computing a first PWM duty cycle value corresponding to a target output voltage based on the relationship;
configuring the first PWM duty cycle value for a first PWM signal;
measuring an actual output voltage from the voltage regulator driven by the first PWM signal;
comparing the target output voltage with the measured actual output voltage; and
re-calibrating the relationship between the PWM duty cycle value and the output voltage when a difference between the target output voltage with the measured actual output voltage e exceeds an acceptable error range.

19. The device of claim 18, wherein the controller is further configured to:
adjust the acceptable error range based on output voltage performance.

20. The device of claim 11, wherein the controller is further configured to drive the circuit board by configuring the PWM duty cycle value based on the calibrated relationship by:
computing a set PWM duty cycle value based on the calibrated relationship and a target output voltage;
configuring the set PWM duty cycle value for a set PWM signal; and
generating the target output voltage according to the set PWM signal.

\* \* \* \* \*